(12) United States Patent
Nakamura et al.

(10) Patent No.: US 9,921,452 B2
(45) Date of Patent: Mar. 20, 2018

(54) ELECTROPHORETIC DISPLAY DEVICE AND ELECTRONIC APPARATUS

(71) Applicant: Seiko Epson Corporation, Tokyo (JP)

(72) Inventors: Kiyoshi Nakamura, Matsumoto (JP); Kei Kamakura, Hara-mura (JP); Soichi Moriya, Suwa (JP); Toru Katakabe, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/255,810

(22) Filed: Sep. 2, 2016

(65) Prior Publication Data

US 2017/0068145 A1    Mar. 9, 2017

(30) Foreign Application Priority Data

Sep. 4, 2015   (JP) ................. 2015-174999

(51) Int. Cl.
*G02B 26/00*   (2006.01)
*G09G 3/34*    (2006.01)
*G02F 1/167*   (2006.01)
*G02F 1/1339*  (2006.01)
*G02F 1/1333*  (2006.01)
*G02F 1/1343*  (2006.01)

(52) U.S. Cl.
CPC ............ *G02F 1/167* (2013.01); *G02F 1/1339* (2013.01); *G02F 1/13439* (2013.01); *G02F 1/133345* (2013.01); *G02F 2001/1676* (2013.01)

(58) Field of Classification Search
CPC . G09G 3/344; G02F 1/167; G02F 2001/1672; G02F 2001/1676; G02F 2001/1678

USPC ............ 359/296; 345/107; 430/32; 204/600
See application file for complete search history.

(56) References Cited

U.S. PATENT DOCUMENTS

2005/0286116 A1   12/2005   Kanbe
2013/0313491 A1*  11/2013   Vilner ................... G02B 3/14
                                               252/519.21

FOREIGN PATENT DOCUMENTS

JP   2005-128501 A   5/2005
JP   2005-346010 A   12/2005
JP   2013-57974 A    3/2013

* cited by examiner

*Primary Examiner* — William Choi
(74) *Attorney, Agent, or Firm* — ALG Intellectual Property, LLC

(57) ABSTRACT

The electrophoretic display device includes an element substrate (first substrate), a counter substrate (second substrate) being disposed opposite to the element substrate, a partition being disposed between the element substrate and the counter substrate, and a dispersion liquid containing electrophoretic particles and the dispersion medium, which is disposed in a cell (space) defined by the partition. Further, a pixel electrodes (first electrode) is disposed on the dispersion liquid side of the element substrate, a common electrode (second electrode) is disposed on the dispersion liquid side of the counter substrate, the electrophoretic display device includes a coating layer on a surface in contact with the dispersion liquid in at least one electrode side of the pixel electrode and the common electrode, and the contact angle to water of the coating layer is not less than 60°.

17 Claims, 9 Drawing Sheets

ELECTROPHORETIC DISPLAY DEVICE AND ELECTRONIC APPARATUS

BACKGROUND

1. Technical Field

The present invention relates to an electrophoretic display device and an electronic apparatus.

2. Related Art

An electrophoretic display device utilizing electrophoresis of particles has been known. The electrophoretic display device is advantageous in having a portability and low power consumption.

In the electrophoretic display device, an image is formed on a display region by applying a voltage between a pixel electrode and a common electrode which are opposite to each other with an electrophoretic dispersion liquid containing electrophoretic particles in between to spatially move electrophoretic particles such as charged black particles or white particles. Known electrophoretic display devices include, for example, a structure where a plurality of cells (spaces) are defined by a partition between a pair of substrates and each cell seals an electrophoretic dispersion liquid containing electrophoretic particles and a dispersion medium.

More specifically, as such an electrophoretic display device, as described in JP-A-2013-57974, there is proposed a device in which a partition is placed between a common electrode and pixel electrodes respectively disposed on a pair of substrates, and electrophoretic dispersion liquid is sealed inside cells defined by the pixel electrodes, the common electrode and the partition.

However, when the cell is defined by the pixel electrodes, the cell common electrode and the partition, the electrodes of the pixel electrodes and the common electrode directly contact the electrophoretic dispersion liquid. Therefore, every time images are formed due to the movement of the electrophoretic particles, the electrophoretic particles come in contact with at least one of the electrodes. As a result, since the electrophoretic particles are adsorbed (affixed) to the electrode, electrical display characteristics of the electrophoretic display device are significantly lowered.

Also, the adsorption of the electrophoretic particles may occur against not only the electrode, but also against the partition depending on the conditions of the constituent material of the partition, the charge amount of the electrophoretic particles and the like.

SUMMARY

An advantage of some aspects of the invention is to provide an electrophoretic display device which suppresses or prevents the adsorption, into the cell, of the electrophoretic particles contained in the electrophoretic dispersion liquid in order to promote excellent display characteristics and high reliability of electronic apparatus.

Such objects are achieved by the invention described below.

According to an aspect of the invention, the electrophoretic display device includes: a first substrate; a second substrate disposed opposite to the first substrate; a partition disposed between the first substrate and the second substrate; and a dispersion liquid containing electrophoretic particles and a dispersion medium and disposed in a space defined by the partition, wherein a first electrode is disposed on the first substrate, and a second electrode is disposed on the second substrate, at least one of the first electrode and the second electrode includes a coating layer on a surface thereof which is in contact with the dispersion liquid, and a contact angle to water of the coating layer is not less than 60°.

Accordingly, since the adsorption, into the cell, of the electrophoretic particles contained in the electrophoretic dispersion liquid can be suppressed or prevented, the electrophoretic display device can maintain excellent display characteristics for a long time.

The electrophoretic display device according to the invention includes the sealing layer which is disposed on the dispersion liquid side of the second substrate, it is preferable that the sealing layer have the coating layer on a surface thereof which is in contact with the dispersion liquid.

Accordingly, since the adsorption, into the cell, of the electrophoretic particles contained in the electrophoretic dispersion liquid can be suppressed or prevented, the electrophoretic display device can maintain excellent display characteristics for a long time.

The electrophoretic display device according to the invention includes an insulating layer which is disposed on the dispersion liquid side of the first substrate, it is preferable that the insulating layer have the coating layer on a surface thereof which is in contact with the dispersion liquid.

Accordingly, since the adsorption, into the cell, of the electrophoretic particles contained in the electrophoretic dispersion liquid can be suppressed or prevented, the electrophoretic display device can maintain excellent display characteristics for a long time.

In the electrophoretic display device according to the invention, it is preferable that the partition further include the coating layer on a surface in contact with the dispersion liquid.

Accordingly, since the adsorption, into the cell, of the electrophoretic particles contained in the electrophoretic dispersion liquid can be suppressed or prevented, the electrophoretic display device can maintain excellent display characteristics for a long time.

In the electrophoretic display device according to the invention, it is preferable that the contact angle to methylene iodide of the coating layer be not more than 50°.

Accordingly, the coating layer can be said to definitely show a low polarity, an adsorption of the electrophoretic particles to the coating layer can be properly suppressed or prevented.

In the electrophoretic display device according to the invention, it is preferable that the coating layer mainly contain at least one of cycloolefin polymer, ethylene-vinyl alcohol copolymer and a methyl terpene copolymers.

Since these materials are particularly lower polarity material, it is possible to more reliably prevent the electrophoretic particles from sticking to the coating layer.

In the electrophoretic display device according to the invention, it is preferable that the coating layer have the average thickness of not less than 0.05 μm and not more than 0.5 μm.

Accordingly, the second sealing layer reliably has a function as a coating layer. Further, since the entire sealing layer (laminate) can be relatively soft, the top portion of the partition can be set firmly on the sealing layer.

According to an aspect of the invention, an electronic apparatus includes the electrophoretic display device according to the invention.

Thus, high performance and reliable electronic apparatus is obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an electrophoretic display device and an electronic apparatus according to the invention, will be described in detail with reference to the preferred embodiments showing the accompanying drawings.

Also, in the following embodiments, for example, the description of "on the substrate" includes the case of being disposed with contact on the substrate, being disposed on the substrate via other structures, or being disposed so as to have partial direct contact with contact on the substrate and partial contact on the substrate via other structures.

Electronics

Firstly, prior to describing the electrophoretic display device according to the invention will be described an electronic apparatus comprising the electrophoretic display device according to the invention (the electronic apparatus according to the invention).

Figure 1:
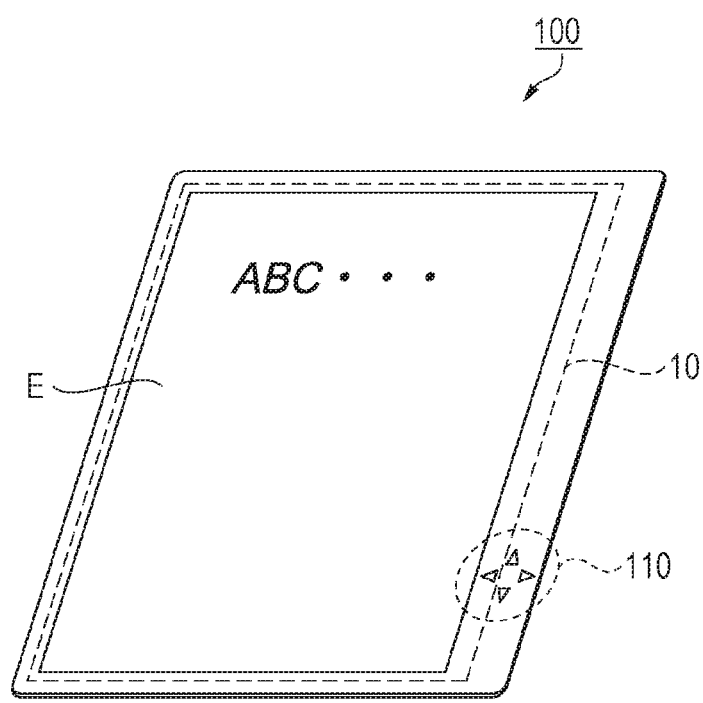
FIG. 1 is a perspective view showing an embodiment of the electronic apparatus onboard the electrophoretic display device according to the invention.

FIG. 1 is a perspective view showing an embodiment of an electronic apparatus onboard the electrophoretic display device according to the invention. Also, the drawings used (including FIG. 1 and the following drawings) are displayed appropriately enlarged or reduced as parts described is recognizable embodiment.

As shown in FIG. 1, an electronic apparatus 100 includes an electrophoretic display device 10, and an interface for operating the electronic apparatus 100. This interface is specifically, for example, an operation unit 110 which includes a switch and the like.

The electrophoretic display device 10 includes an electrophoretic display device according to the invention and is a display module having a display region E. The display region E includes a plurality of pixels, and an image is displayed in the display region E by electrically controlling these pixels.

Besides the electronic paper (EPD: Electronic Paper Display) shown in FIG. 1, the electronic apparatus 100 having the electrophoretic display device 10 is applicable to watches, wristable devices, smart phones, tablet terminals, televisions, view finder type or monitor direct view type of video tape recorder, car navigation systems, pagers, electronic organizers, electronic calculators, electronic newspapers, word processors, personal computers, workstations, a television telephones, POS terminals, touch panels, or the like.

Electrophoretic Display Device

First Embodiment

Next, a first embodiment of the electrophoretic display device 10 (the electrophoretic display device according to the invention) included in the electronic apparatus 100 will be described below.

Figure 2:
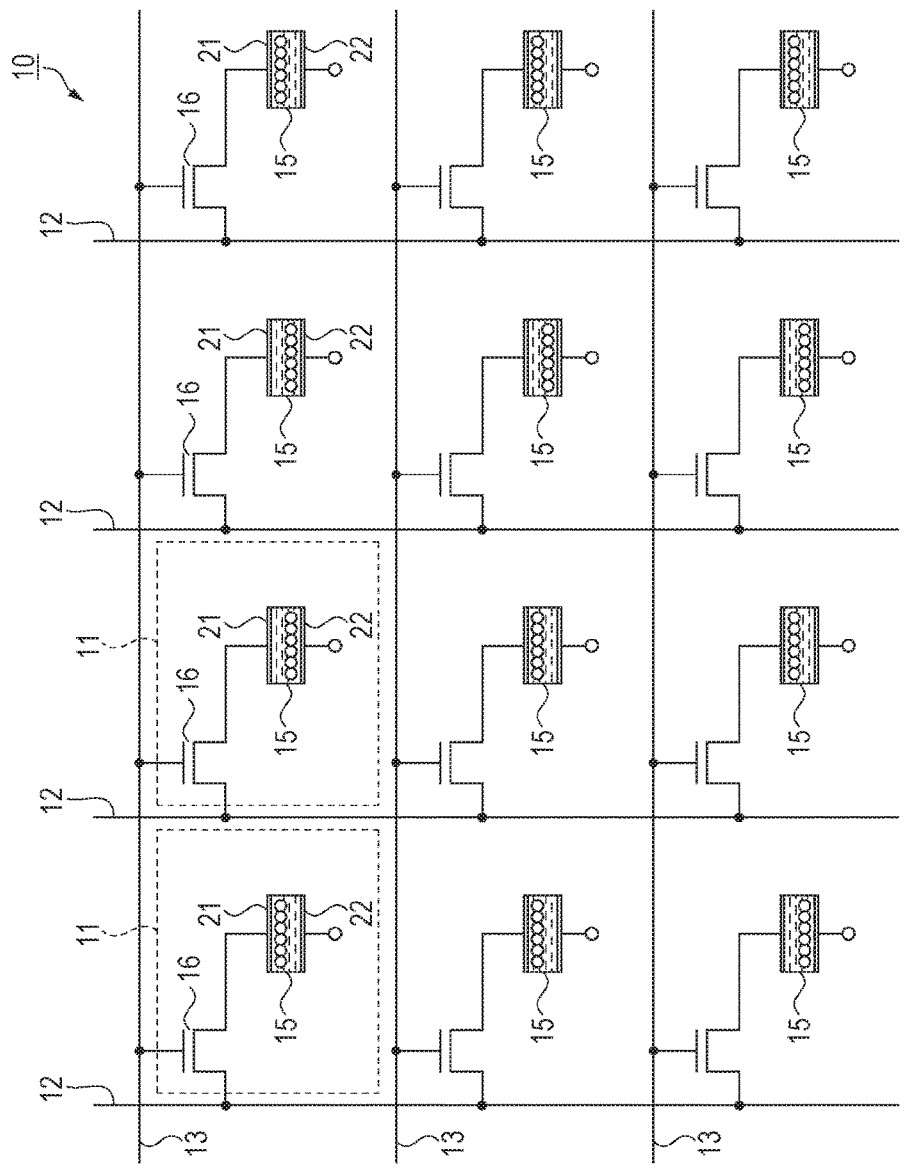
FIG. 2 is an equivalent circuit diagram showing a first embodiment of the electrical configuration of the electrophoretic display device according to the invention.
Figure 3:
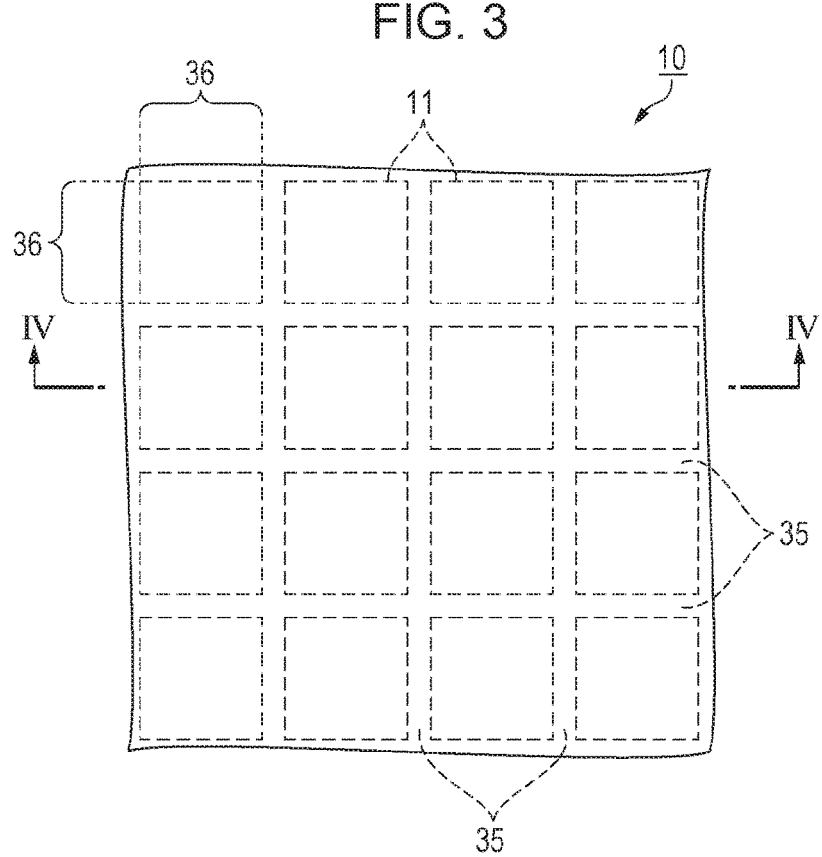
FIG. 3 is a schematic plan view showing a first embodiment of the structure of the electrophoretic display device according to the invention.
Figure 4:
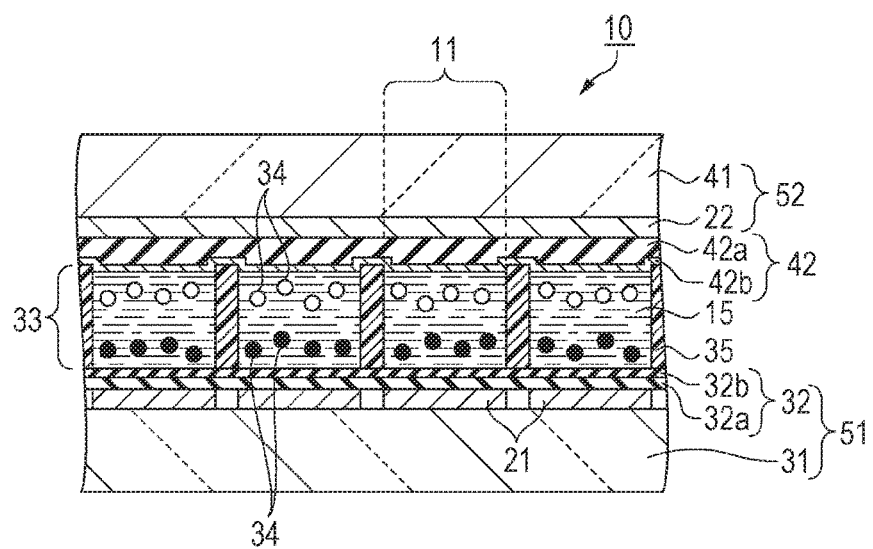
FIG. 4 is a line IV-IV cross-sectional view of the electrophoretic display device shown in FIG. 3.
Figure 5:
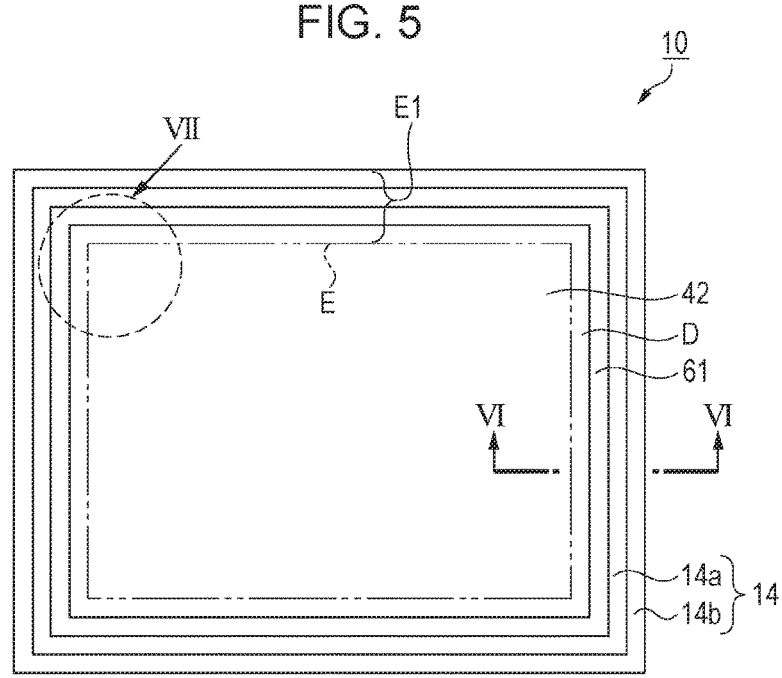
FIG. 5 is a schematic plan view of the structure of a sealing layer and the peripheral seal part of the electrophoretic display device shown in FIG. 3.
Figure 6:
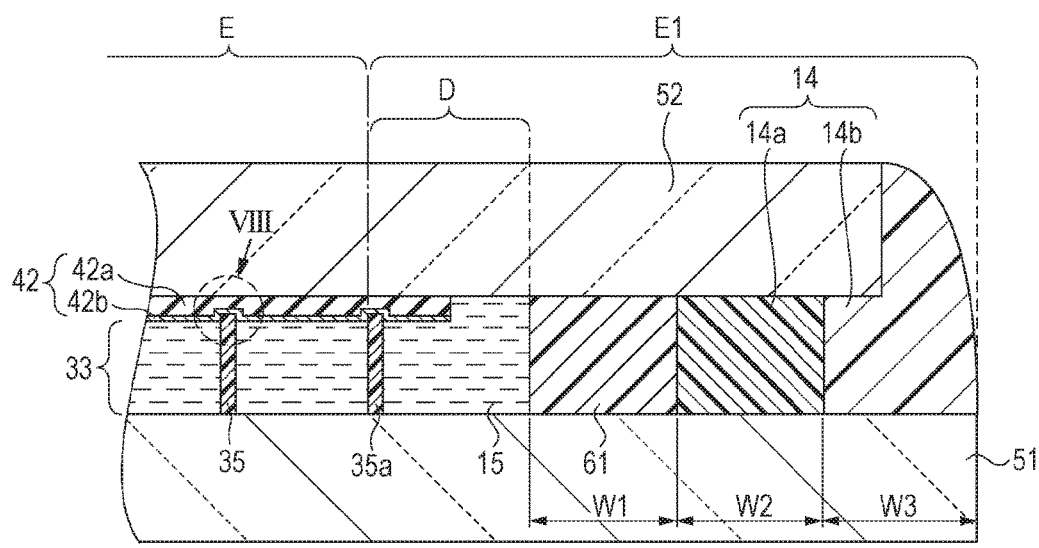
FIG. 6 is a line VI-VI cross-sectional view of the electrophoretic display device shown in FIG. 5.
Figure 7:
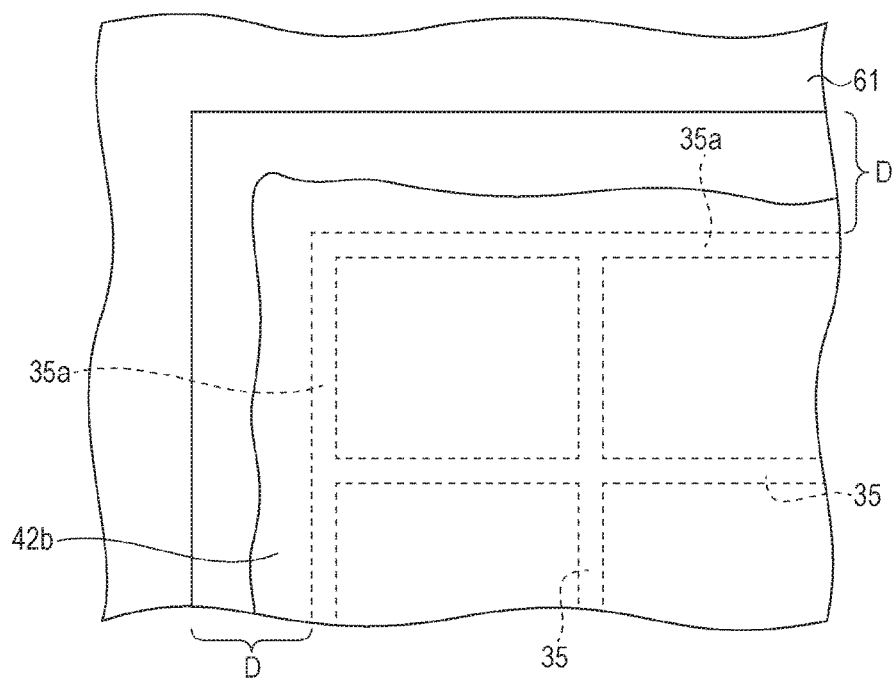
FIG. 7 is an enlarged plan view showing an enlarged VII part of the electrophoretic display device shown in FIG. 5.
Figure 8:
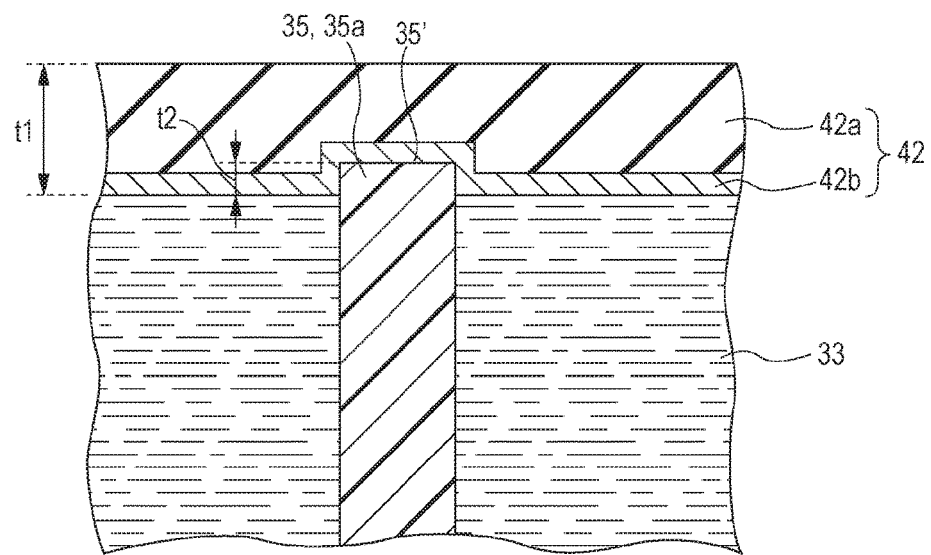
FIG. 8 is an enlarged cross-sectional view showing an enlarged VIII part of the electrophoretic display device shown in FIG. 6.

FIG. 2 is an equivalent circuit diagram showing a first embodiment of the electrical configuration of the electrophoretic display device according to the invention, FIG. 3 is a schematic plan view showing a first embodiment of the structure of the electrophoretic display device according to the invention, FIG. 4 is a line IV-IV cross-sectional view of the electrophoretic display device according to the invention shown in FIG. 3, FIG. 5 is a schematic plan view of the structure of a sealing layer and the peripheral seal part of the electrophoretic display device shown in FIG. 3, FIG. 6 is a line VI-VI cross-sectional view of the electrophoretic display apparatus shown in FIG. 5, FIG. 7 is an enlarged plan view showing an enlarged VII part of the electrophoretic display device shown in FIG. 5, FIG. 8 is an enlarged cross-sectional view showing an enlarged VIII part of the electrophoretic display device shown in FIG. 6. Also, in FIGS. 5 to 8, an insulating layer, wiring, and the illustrated electrode and the like will be omitted.

As shown in FIG. 2, the electrophoretic display device 10 includes a plurality of data lines 12, and a plurality of scanning lines 13, the pixel 11 is arranged in a portion where the data lines 12 and scanning lines 13 intersect. Specifically, the electrophoretic display device 10 includes a plurality of pixels 11 arranged in a matrix along the data lines 12 and scanning lines 13. Each pixel 11 has electrophoretic dispersion liquid containing electrophoretic particles 34 and a dispersion medium 15 disposed between a pixel electrode 21 and a common electrode 22.

The pixel electrode 21 is connected to the data line 12 via a transistor 16 (TFT 16). Further, the gate electrode of the TFT 16 is connected to the scanning line 13. Also, FIG. 2 is exemplary, if necessary, other elements such as a storage capacitor may be incorporated.

Further, as shown in FIGS. 3 and 4, the electrophoretic display device 10 includes an element substrate (first substrate) 51, a counter substrate (second substrate) 52, and an electrophoretic layer 33.

The element substrate 51 is provided with, for example, a pixel electrode (first electrode) 21 corresponding to each pixel 11 disposed on a first base member 31 which is made of a translucent glass substrate.

More specifically, as shown in FIGS. 3 and 4, the pixels 11 (pixel electrode 21) is formed, for example, a matrix in a plan view. Materials of the pixel electrode 21 are used for example light transmitting materials such as ITO (tin added indium oxide: Indium Tin Oxide) or the like.

The circuit section (not shown) is provided between the first base member 31 and the pixel electrode 21, includes TFT 16 and the like. TFT 16 are electrically connected to each pixel electrode 21 via a contact portion (not shown). Although not shown, various wiring lines (for example, data lines 12 or scanning lines 13, etc.) and elements (for example capacitors) and the like are disposed along with TFT 16 in the circuit portion.

Further, an insulating layer 32 is formed on the entire surface of the first base member 31 including the upper pixel electrode 21. The insulating layer 32 has a first insulating layer 32a which is located in the pixel electrode 21 side, and a second insulating layer 32b which is laminated on the first insulating layer 32a on the opposite side of the pixel electrode 21. Also, the insulating layer 32 will be described later in detail.

The element substrate 51 is configured by the first base member 31, the pixel electrode 21, the insulating layer 32 and a circuit unit.

A common electrode (second electrode) 22 is formed on a second base member 41, which is included in the counter substrate 52 and made of a glass substrate (dispersion medium 15 side in FIG. 4). The common electrode 22 is provided commonly corresponding to the plurality of pixels 11 having translucency. The common electrode 22 is used for example light-transmitting material such as ITO.

The counter substrate 52 includes these second base member 41 and the common electrode 22.

Further, a first sealing layer 42a is formed on the common electrode 22. Also, a second sealing layer 42b is formed on the first sealing layer 42a. Also, It should be noted that the first sealing layer 42a and the second sealing layer 42b are collectively referred to as a sealing layer 42. The sealing layer 42 will be described in detail later.

The electrophoretic layer 33 is provided between the insulating layer 32 and the sealing layer 42.

The electrophoretic layer 33 is composed of an electrophoretic dispersion liquid which contains at least one or more electrophoretic particles 34 and a dispersion medium 15 in which the electrophoretic particles 34 are dispersed. The electrophoretic dispersion liquid (dispersion medium 15 and electrophoretic particles 34) is used to fill a (divided) space (region) which is defined by an insulating layer 32, a second sealing layer 42b, and the partition 35 provided on the first base member 31 (the ribs).

As shown in FIG. 3, partitions 35 are formed in a grid pattern. The partition 35 is preferably formed of a transparent material (such as acrylic or epoxy resin). The width of the partition 35 is for example 5 µm.

In, the embodiment a structure where the pixel electrode 21 is disposed in each pixel 11 and the partition 35 (rib) is disposed in each pixel electrode 21 has been described. This is not limiting and the partitions (ribs) may be formed in each of a plurality of pixels (for example, for every 2 to 20 pixels).

Also, when the element substrate 51 and the counter substrate 52 are bonded together, the upper portion of the partition 35 is in contact with the counter substrate 52 (specifically, the sealing layer 42) thus determining a cell gap between the element substrate 51 and the counter substrate 52 relative to the height of the partition 35 (actually, a frame partition 61 of FIG. 6). The thickness of the electrophoretic layer 33 is determined based on this cell gap.

Also, hereafter, a region surrounded by the partition 35, the insulating layer 32 and the sealing layer 42 referred to as cell 36. Also, a charged electrophoretic layer 33 is included in one cell 36.

Further, the height of the partition 35 is set to be approximately equal to the thickness of the electrophoretic layer 33 is defined by the partition 35, for example, preferably not less than 10 µm and not more than 150 µm, more preferably not less than 20 µm and not more than 100 µm, particularly preferably about 30 µm. Thereby, it is possible to display with excellent contrast and white display and black display by movement of the electrophoretic particles 34.

In the present embodiment, as shown in FIG. 4, white particles and black particles are shown as the electrophoretic particles 34. For example, when a voltage is applied between the common electrode 22 and the pixel electrode 21, in accordance with an electric field generated between them, the electrophoretic particles 34 electrophones toward either of the electrodes (the pixel electrode 21 or the common electrode 22). For example, if the white particles have a positive charge, the pixel electrode 21 is a negative potential, then the white particles move to the pixel electrode 21 side (lower side) to be gathered, and thus become a black display.

In contrast, if the pixel electrode 21 is a positive potential, the white particles move to the common electrode 22 side (upper side) to be gathered by migration, thereby becoming a white display. Thus, according to the presence and numbers of white particles to assemble toward the electrode on the display side, desired information (picture) is displayed. Although white particles and black particles are used here as the electrophoretic particles 34, particles of another color may be used.

Also, as the electrophoretic particles 34, the particles of inorganic pigment, the particles or polymeric fine particles of the organic pigment can be used, and two or more of various particles may be mixed to use. The electrophoretic particles 34 are used for example the order of the average particle diameter of the electrophoretic particles 34 being not less than 0.05 µm and not more than 10 µm, preferably, not less than 0.2 µm and not more than 2 µm.

The content of the white particles is within 30% with respect to the total weight of the dispersion medium 15, the white particles and black particles, i.e. the electrophoretic dispersion liquid. The content of the black particles is within 10% with respect to the total weight of the dispersion medium 15, the white particles and black particles, i.e. the electrophoretic dispersion liquid. By such distribution, the reflectance is not less than 40%, and black reflectance is not more than 2%, and therefore it is possible to improve the display performance.

Further, in the present embodiment, a dispersion medium 15 is used a silicone oil being movable the electrophoretic particles 34 at a temperature of about −30° C. The viscosity of the silicone oil is for example not more than 10 cP. The silicone oil is a low viscosity solvent, and thus the electrophoretic particles can migrate between the electrodes at a speed of not more than 500 ms for example even at a low temperature of about −30° C.

As the dispersion medium 15, besides silicone oils, for example alcohols such as butanol and glycerin, cellosolves such as butyl cellosolve, esters such as butyl acetate, ketones such as dibutyl ketone, pentane and aliphatic hydrocarbons s (liquid paraffin), and a nitrile such as acetonitrile can be used.

Further, as shown in FIGS. 5 and 6, the electrophoretic display device 10 includes a display region E, and a frame region E1 surrounding the display region E. The frame region E1 includes a dummy pixel region D which is a region that does not contribute to the display of the electrophoretic layer 33, a frame partition 61 disposed outside the dummy pixel region D, and a seal portion 14 which is located outside the frame partition 61.

Also, the width of the frame region E1 is for example about 1 mm. The width of the dummy pixel region D is for example 80 μm. A rib width (the width of the top portion 35') of a partition, in the display region E side of the dummy pixel region D, arranged partition 35a formed in the same shape as the partition 35 disposed in the display region E is about not less than 3 μm and not more than 10 μm, and is 5 μm in the embodiment. The distance between the adjacent barrier ribs is for example 150 μm.

On the outside of the dummy pixel region D, the frame partition 61 is provided. The frame partition 61 can block the dispersion medium 15 so as not flowing outward, and are used for adjusting the cell gap and are arranged so as to surround the dummy pixel region D. Also, the frame partition 61 is usually made of the same material as the partition 35 of the display region E.

The width W1 of the frame partition 61 is for example 100 μm. The thickness of the frame partition 61 is for example in the range of 10 μm to 50 μm, which is 33 μm in the embodiment.

Also, the frame partition 61 is also used to ensure that the first seal member 14a disposed adjacent does not protrude in the display region E.

In this embodiment, as shown in FIG. 6, the sealing portion 14 has a first sealing material 14a and a second sealing material 14b. The first seal member 14a is used to adhere when bonding the element substrate 51 and the counter substrate 52 and are provided so as to surround the frame partition 61.

The width W2 of the first sealing material 14a is for example 400 μm. The viscosity of the first sealing material 14a is for example not less than 300,000 Pa·s and not more than 1 million Pa·s, is preferably about 400,000 Pa·s. The use of the first sealing material 14a having such viscosity can be kept increasing the contact area between the element substrate 51 and the counter substrate 52 in case of the bonding of the element substrate 51 and the counter substrate 52.

Further, the second seal member 14b is used to seal between the element substrate 51 and the counter substrate 52 and is disposed so as to surround the first seal material 14a.

The width W3 of the second sealing member 14b is for example 400 μm. The viscosity of the second sealing member 14b is for example not less than 100 Pa·s and not more than 500 Pa·s, preferably about 400 Pa·s. The use of the second sealing member 14b having such viscosity allows the second seal member to enter between the element substrate 51 and the counter substrate 52 around the first seal member 14a. Therefore, an adhesive strength of the second sealing member 14b can be improved. Further, the invading of the moisture to the inside through the second sealing member 14b and the first seal member 14a from the outside can be suppressed, and thus a reliable sealing structure is obtained.

Also, the sealing portion 14 is besides the case of providing as separate bodies as the case of a first sealing material 14a and the second sealing member 14b may be composed of a single second sealing member 14b with omitting the first sealing material 14a according to the constituent material of the second sealing member 14b.

As shown in FIGS. 6 and 8, a sealing layer 42 is provided between the top portion 35' of the septum 35 and the counter substrate 52 in the display region E.

Thus, the space (cell) defined by a sealing layer 42, an insulating layer 32, and the partition 35 (the rib) is formed, and an electrophoretic dispersion liquid containing a dispersion medium 15 and electrophoretic particles 34 is used to fill this space (closed space). As a result, a dispersion medium 15 and electrophoretic particles 34 cannot be traffic between adjacent the cells 36 and the cell 36.

Further, in the present embodiment, as shown in FIGS. 6 and 8, among the contact face between the sealing layer 42 and the electrophoretic layer 33 (the contact face with the first sealing layer 42a and the second sealing layer 42b), a part of overlapping with the partition 35 in a plan view, is located in the second base member 41 (counter substrate 52) side in cross section than the part which does not overlap with the partition 35 in a plan view, thereby, the top portion 35' of the partition 35 has bite into the sealing layer 42. Thus, the bite of the top 35' into the sealing layer 42 is more accurately suppressed or prevented the back and forth of an electrophoretic dispersion liquid (dispersion liquid) that has been used to fill the closed space defined by a sealing layer 42, an insulating layer 32, and the partition 35 between the adjacent cell 36.

Furthermore, when compared with an portion (non-overlapping portion by the partition 35 in a plan view) of not biting of the top portion 35' of the contact face between the first sealing layer 42a and the second sealing layer 42b and the top part 35', as shown in FIG. 8, the top portion 35' is positioned in the second base member 41 side. The biting amount t2 of the partition 35 into the sealing layer 42, that is the distance between a not biting portion of the top portion 35' of the plane of the electrophoretic layer 33 side of the second sealing layer 42b and a top portion 35', is for example preferably from 1 μm to 5 μm, which is 2 μm in this embodiment. Thus, the effect obtained by causing bite the top 35' in the sealing layer 42 can be more remarkably exhibited.

The average thickness t1 of the seal layer 42 is preferably for example about not less than 2.6 μm and not more than 8 μm, and is 5 μm in this embodiment.

In this embodiment, such sealing layer 42, as described above with reference to FIG. 4, is includes a laminate which is composed of the counter substrate 52 (the common electrode 22) side and the first sealing layer 42a and the second sealing layer 42b in this order.

In the sealing layer 42 (laminate), a first sealing layer 42a is preferably consist of a flexible material than the second sealing layer 42b, and thus the top portion 35' of the partition 35 has become easier to bite into the sealing layer 42.

The constituent material of the first sealing layer 42a includes such as rubber materials which is for example NBR (acrylonitrile-butadiene rubber), urethane rubber, isoprene rubber, butadiene rubber, chloroprene rubber, styrene-butadiene rubber, hydrin rubber, nitrile rubber and the like, single or in combination of two or more of above them may be used. In above them, NBR is preferable. Thus, the top 35' can be bitten into the sealing layer 42.

Further, elastic modulus at room temperature of the first sealing layer 42a is preferably not less than 0.1 MPa and not more than 50 MPa, the elastic modulus at room temperature is 20 MPa in the present embodiment. The setting of the elastic modulus of the first sealing layer 42a within the above range sets the elastic modulus of the stacked body, that is the entire sealing layer 42 within an appropriate range, and thus the top portion 35' of the partition 35 can be certainty bitten into (deformed the sealing layer 42 by the top portion 35' of the partition 35) the sealing layer 42 without bent of the top portion 35' of the partition 35 or damage of the second sealing layer.

The average thickness of the first sealing layer 42a is preferably not less than 2.5 μm and not more than 20 μm, which is 4.5 μm in the present embodiment. Accordingly, the thickness that can be bite firmly on the sealing layer 42 a top portion 35' of the partition 35 can be secured to the sealing layer 42.

Further, the volume resistivity of the first sealing layer 42a is preferably not less than $1 \times 10^7$ Ω·cm and not more than $5 \times 10^{10}$ Ω·cm. Thus, due to the sealing layer 42 is interposed between the pixel electrode 21 and the common electrode 22, a decrease of the mobility of the electrophoretic particles 34 can be accurately suppressed or prevented.

The second sealing layer 42b is the electrophoretic layer 33, that is a coating layer of the first sealing layer 42a, constituting the surface (surface) in contact with dispersion liquid (electrophoretic dispersion liquid), the contact angle to water (pure water) of the second sealing layer (the sealing layer) 42b has is not less than 60°.

Here, as described above, in the electrophoretic display device, when a cell is defined by pixel electrodes, common electrode and the partition, since the electrophoretic dispersion liquid are directly in contact with the electrodes of the pixel electrodes and the common electrode, the electrophoretic particles are in contact with at least one of the electrodes in each time of formation of an image by moving the electrophoretic particles, due to this, since the electrophoretic particles are adsorbed (affixed) to the electrode, it is problem that occurring of the rewriting of the image of the electrophoretic display device response delay, reduction in reflectance, deterioration of color and the like, that is significantly lower of the display characteristics of the electrophoretic display device.

In contrast, in the invention, second sealing layer (coating layer) 42b is on the surface which is in contact with the electrophoretic layer 33 (the electrophoretic dispersion liquid), the contact angle to water of the second sealing layer 42b is not less than 60°, and the second sealing layer 42b indicates a low polarity. Therefore, although the electrophoretic particles 34 is in contact with the second sealing layer 42b in each time of formation of an image by the movement of the electrophoretic particles 34, the second sealing layer 42b indicates a low polarity, and thus, because the attractive force (electrostatic attraction, van der Waals forces) between the second sealing layer 42b and the electrophoretic particles 34 can be reduced, A adsorption of electrophoretic particles 34 to the second sealing layer 42b can appropriately suppress or prevent. Thus, the electrophoretic display device 10 becomes to maintain excellent display characteristics for a long time.

The contact angle to water of the second sealing layer 42b may be not less than 60°, but preferably not less than 70° and not more than 95°, more preferably not less than 80° and not more than 90°. As a result, the effect makes it possible to conspicuously exhibit the effect, and since the repulsive force to the electrophoretic particles 34 of the second sealing layer 42b becomes undesirably too high, it can be accurately suppressed or prevented that electrophoretic particles 34 cannot gather on the common electrode 22 side when the electrophoretic particles 34 is moved to form an image.

Further, the contact angle to methylene iodide of the second sealing layer 42b is preferably not more than 50°, and more preferably not less than 20° and not more than 40°. Thus, a second sealing layer 42b can be show more reliably a low polarity, and thus the adsorption of the electrophoretic particles 34 on the second sealing layer 42b can properly suppress or prevent.

Also, in the present specification, each of the contact angles to water and methylene iodide of the second sealing layer 42b refers to a measured value in conformity with JIS R3257.

The constituent material of the second sealing layer 42b includes for example besides polymerizable cycloolefin polymer (COP) such as hydrogenated ring-opening metathesis polymerization type cycloolefin polymer represented by the following general formula (I), the additional co-express type cycloolefin polymers by the following general formula (II); polyvinyl acetals such as methylpentene copolymers (TPX) represented by the following general formula (III), polyvinyl butyral (PVB) containing a butyral group represented by the following general formula (IV); polyvinyl alcohol (PVA); a non-polar polymers such as polymethylmethacrylate (PMMA), polycarbonate (PC), polyethylene terephthalate (PET) and the like, one or two or more of these may be used in combination. In particular, at least one kind of a cycloolefin copolymer, ethylene-vinyl alcohol copolymer and a methyl terpene copolymer is preferable. These materials particularly is the lower polarity material, thereby the fixing of the electrophoretic particles 34 to the second sealing layer 42b more reliably prevent. Further, there is little possibility that these materials (especially, COP) is eluted in the dispersion medium 15, and thus the second sealing layer 42b can also be provided with a function as a sealing layer that prevents the first sealing layer 42a from eluting into the dispersion medium 15.

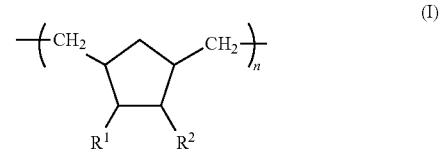

(I)

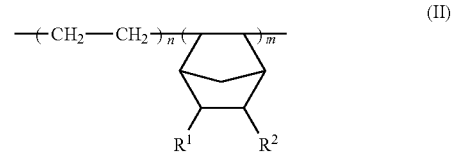

(II)

where, $R^1$ and $R^2$ each independently represent a hydrogen atom or an alkyl group having 1 to 10 carbon atoms, n and m each independently represent an integer of 1 or more.

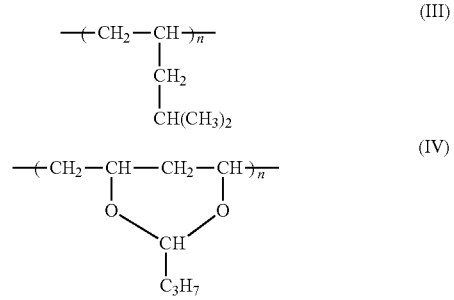

where, n independently represents an integer of 1 or more.

Also, the second sealing layer 42b may contain additives to soften the material of the second sealing layer 42b (that is, the elastic modulus of the second sealing layer 42b is lower). The additive may also be used for example a mixture of one or more compounds selected from polyethylene glycol, glycerine, urea, polyethylene oxide, polypropylene glycol, particularly glycerin is preferably. Thus, the elastic modulus of the second sealing layer 42b is reliably lowered.

Further, the thickness of the second sealing layer 42b is preferably not less than 0.05 μm and not more than 0.5 μm, more preferably not less than 0.1 μm and not more than 0.3 μm. Further, in this embodiment, it is set to 0.25 μm. This makes it possible to reliably impart the function as the coating layer to the second sealing layer 42b. Further, a whole the sealing layer 42 (laminate) make it possible to relatively soft, the top portion 35' of the partition 35 can be bitten firmly into the sealing layer 42.

Furthermore, a breaking elongation tensile at room temperature of the second sealing layer 42b (defined in JIS K7113) is preferably not less than 40%, more preferably not less than 60% and not more than 400%, a breaking elongation tensile at room temperature is 80% in the present embodiment. Thus, the top portion 35' extends when the top portion 35' of the partition bites into the second sealing layer 42b, and thus the stress is alleviated. Therefore, the bent of the top portion 35' of the partition 35 or the damage of the second sealing layer 42b can be appropriately suppressed or prevented.

Also, the second sealing layer 42b may be a layer consist the above described a non-polar polymer as a main material, in addition to for example a monomolecular film, which includes a silane coupling agent, and the like.

Further, the silane coupling agent is not particularly limited as long as the contact angle to water of the second sealing layer 42b can be made to be not less than 60°, and includes for example, an alkyl group-containing silane-containing coupling agent and a fluoroalkyl group-containing silane coupling agent, and the like, and among them, the fluoroalkyl group-containing silane coupling agent is preferred. Thus, the contact angle to water of the second sealing layer 42b can be easily set not less than 60°.

The fluoroalkyl group-containing silane coupling agent represents for example the general formula $F_3C-(CF_2)_n-(CH_2)_m-Si(O-R)_3$, wherein, n represents an integer of 0 to 4, R represents an alkyl group having 1 to 3 carbon atoms, and includes in particularly 3,3,3-trifluoropropyl trimethoxy silane, 3,3,3trifluoropropyl tri acetoxy silane, dimethyl-3,3,3-trifluoropropyl silane, tridecafluoro-1,1,2,2-tetrahydrooctyl-triethoxy silane, and the like.

Further, besides the case of providing the sealing layer 42 as a laminate of the first sealing layer 42a and the second sealing layer 42b, the sealing layer 42 may include a single layer of the second sealing layer 42b without the first sealing layer 42a depending on the material of the second sealing layer 42b, or, may include a laminate of three or more layers as long as the second sealing layer 42b forms a surface (outermost surface).

Furthermore, as shown in FIGS. 6 and 7, the end portion of the sealing layer 42 disposed for example between the partition 35a which is the outermost periphery of the display region E and the frame partition 61, that is, disposed in the range of the dummy pixel region D. The sealing layer 42 is slightly larger than the display region E, even if a variation occurs in the size, the end portion is set to the size in no entering the display region E.

Further, in the case of using an adhesive as a material for forming the sealing layer 42, adhesive (for example impurities such as fully no cured reactive monomer) contained in the adhesive layer are eluted in the dispersion liquid, and thus the adhesive adheres to the electrophoretic particles 34 contained in the electrophoretic dispersion liquid so that the migration of the electrophoretic particles 34 may affect. However, in the embodiment, the sealing layer 42 has a first sealing layer 42a and the second sealing layer 42b, and a second sealing layer 42b is arranged in a portion in contact with the electrophoretic particles 34. Therefore, such problems can be alleviated.

Furthermore, as shown in FIG. 4, the insulating layer 32 is provided between the element substrate 51 and the electrophoretic layer 33.

Accordingly, the insulation between the pixel electrodes 21 provided in the element substrate 51 is secured, as a result the formation of an image by moving the electrophoretic particles 34 performs in a more excellent accuracy.

In the embodiment, as described above, the insulating layer 32 includes a laminate where the first insulating layer 32a and the second insulating layer 32b were laminated from the first base member 31 (the pixel electrode 21) side in this order.

In the insulating layer 32 (laminate), the first insulating layer 32a is interposed between the plurality of pixel electrodes 21, thereby, an insulation between the adjacent pixel electrode 21 is ensured.

The constituent material of the first insulating layer 32a is not particularly limited as long as it has an insulating property, and for example an insulating resin material is preferably used.

Further, the insulating resin material includes such as polyethylene terephthalate, α-olefins, vinyl acetate, polyvinyl acetal, ethylene vinyl acetate, acrylic, polyamide, vinyl chloride and the like, one or more of these can be used in combination.

The average thickness of the first insulating layer 32a is preferably not less than 0.05 μm and not more than 20 μm, and is set to 2.5 μm in the present embodiment. As a result, the degree of thickness to interpose an insulating layer 32 between the adjacent plurality of pixel electrodes 21 a thickness can be secured in the insulating layer 32.

Further, the volume resistivity of the first insulating layer 32a is preferably not less than $1 \times 10^7$ Ω·cm and not more than $1 \times 10^{11}$ Ω·cm. Thus, due to the insulating layer 32 is interposed between the pixel electrode 21 and the common electrode 22, the decrease of the mobility of the electrophoretic particles 34 can be accurately suppressed or prevented.

The second insulating layer 32b is a coating layer of the first insulating layer 32a, which includes a surface in contact with the electrophoretic layer 33, the contact angle to water of the second insulating layer (covering layer) 32b is not less than 60°.

That is, the second insulating layer 32b for covering the first insulating layer 32a also forms a same configuration as the second sealing layer 42b for covering the first sealing layer 42a.

Therefore, In each time of formation of an image by moving of the electrophoretic particles 34, although the electrophoretic particles 34 contacts the second insulating layer 32b, the contact angle to water of the second insulating layer 32b is not less than 60°, and shows a low polarity, and thus, an adsorption of electrophoretic particles 34 to the second insulating layer 32b appropriately suppress or prevent. Therefore, even if the second insulating layer 32b for covering the first insulating layer 32a is formed, the electrophoretic display device 10 maintain excellent display characteristics for a long time.

Also, in the embodiment, it has been described in the case that the sealing layer 42 and the insulating layer 32 respectively includes a second sealing layer 42b and the second insulating layer 32b on their surface, that is, each of the sealing layer 42 and the insulating layer 32 includes, on the surface, the coating layer whose contact angle to water is not less than 60°, it is not limited to such case, for example, it may be omitted one of the sealing layer 42 and the insulating layer 32.

However, an image is formed by the movement of the electrophoretic particles 34 an opposing substrate 52 (the common electrode 22) side includes the display surface the user recognize. Therefore, it is preferable to prevent the adsorption of the electrophoretic particles 34 in the common electrode 22 (sealing layer 42) side in order to be more superior the display characteristics of the electrophoretic display device 10, and thus it can be said the preferred configuration in the case that a sealing layer 42 includes a second sealing layer 42b. That is, when the sealing layer 42 and the insulating layer 32 respectively include a second sealing layer 42b and the second insulating layer 32b, or the insulating layer 32 does not provide with the second insulating layer 32b, it can be said that the case that the sealing layer 42 includes a second sealing layer 42b is the preferred configuration.

Hereinafter, the manufacturing method for producing the electrophoretic display device 10 according to the first embodiment.

Method of Producing Electrophoretic Display Device

Then, a manufacturing method for producing the electrophoretic display device 10 described above will be described.

Figure 9:
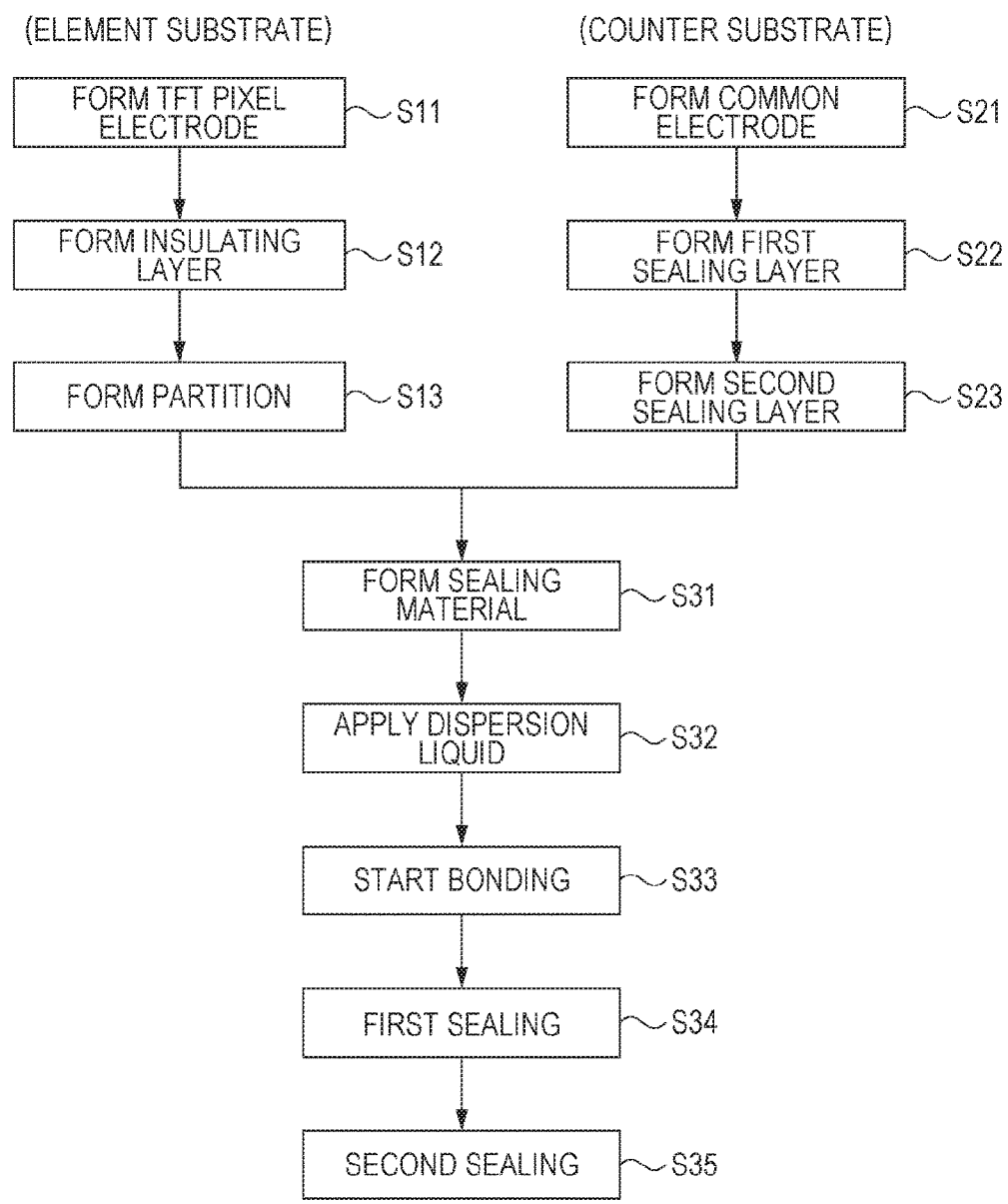
FIG. 9 is a flowchart showing the order of steps the method for producing the electrophoretic display device.

FIG. 9 is a flowchart showing a method of manufacturing an electrophoretic display device in the order of steps. FIGS. 10 to 17 are schematic sectional views for explaining a manufacturing method of the electrophoretic display device shown in FIG. 3. Hereinafter, a method of producing an electrophoretic display device will be described with reference to FIGS. 9 to 17.

1. First, the manufacturing method of the element substrate 51 will be described with reference to FIG. 9.

1-1. First, TFT 16 or a pixel electrode 21, made of a light transmissive material such as ITO, and the like are formed on a first base member 31 made of a transparent material such as glass (step S11).

Specifically, the TFT 16 and the pixel electrode 21 and the like on the first base member 31 are formed by using a known film forming, photolithography technique and etching technique. Also, in the description using a cross-sectional view of a subsequent, description and illustration of such as TFT 16 or the pixel electrode 21 are omitted.

1-2. Then, an insulating layer 32 (first insulating layer 32a and the second insulating layer 32b) is formed on the first base member 31 (step S12).

A method for forming the insulating layer 32 (first insulating layer 32a and the second insulating layer 32b) is not particularly limited, for example an insulating resin material is formed a film on the first base member 31 by using a coating method such as spin coating method to form a first insulating layer 32a, then a non-polar polymer is formed a film by using a coating method in the same manner to form a second insulating layer 32b.

Figure 10:
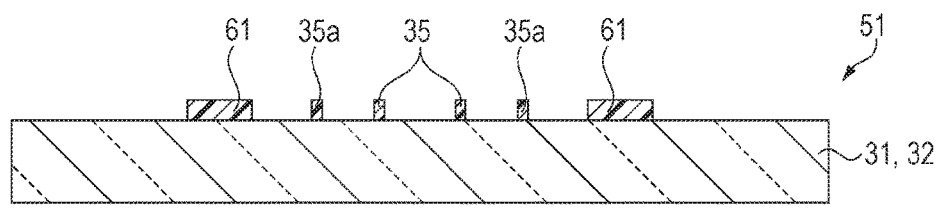
FIG. 10 is a schematic cross-sectional view for explaining a method for producing an electrophoretic display device shown in FIG. 3.

1-3. Then, as shown in FIG. 10, the partition 35 is formed on first base member 31 (specifically, the insulating layer 32) (step S13).

More specifically, the partition 35 of the display region E, and the partition 35a of the outermost periphery of the display region E, a frame partition 61 provided on the outside thereof, formed at the same time.

Partitions 35, 35a, and the frame partition 61 for example can be formed by using a known film forming technique, a photolithography technique and an etching technique.

Thus, the partitions 35, 35a, and the frame partition 61 are simultaneously formed by the same material, thereby being able to be efficiently produced.

Thus, the element substrate 51 is completed.

Also, the partition 35 is made of a material which is insoluble in the dispersion medium 15, regardless of it does not matter whether the material is organic substances or inorganic substances. Specifically, examples of organic material include urethane resin, urea resin, acrylic resin, polyester resin, silicone resin, acryl silicone resin, epoxy resin, polystyrene resin, styrene acrylic resin, polyolefin resin, butyral resin, vinylidene chloride resin, melamine resins, phenol resins, fluorine resins, polycarbonate resins, polysulfone resins, polyether resins, polyamide resins, polyimide resins and the like. These resin alone or two or more types of complex agents is used.

2. Next, a method for producing the counter substrate 52 will be described.

2-1. First of all, a common electrode 22 is formed on the second base member 41 (step S21).

More specifically, the common electrode 22 is formed on the entire surface of the second base member 41 made of a translucent material such as a glass substrate by using a known film formation technique.

2-2. Then, a sealing layer 42 (first sealing layer 42a and the second sealing layer 42b) is formed on the common electrode 22 (step S22, step S23).

Figure 11:
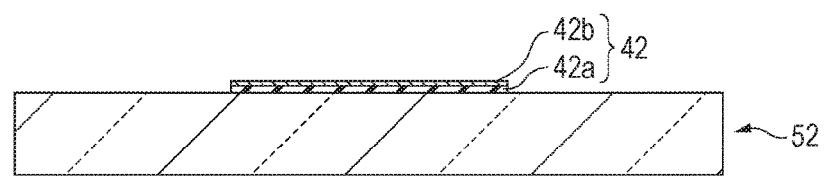
FIG. 11 is a schematic cross-sectional view for explaining a method for producing an electrophoretic display device shown in FIG. 3.

A method of forming the first sealing layer 42a and the second sealing layer 42b, as shown in FIG. 11, for example a rubber-based material is formed a film by using a coating method such as spin coating on the counter substrate 52 so that a first sealing layer 42a was formed. Then, a non-polar polymer is formed a film by using similarly a coating method to form a second sealing layer 42b.

Further, a patterning to correspond to the shape of the first sealing layer 42a and the second sealing layer 42b to be formed by using an etching method obtains a first sealing layer 42a and the second sealing layer 42b. Also, the invention is not limited to a coating method, and may be formed by using a printing method.

Thus, the counter substrate 52 is completed.

3. Then, a method of bonding the element substrate 51 and the counter substrate 52 will be described with reference to FIGS. 9 to 11.

Figure 12:
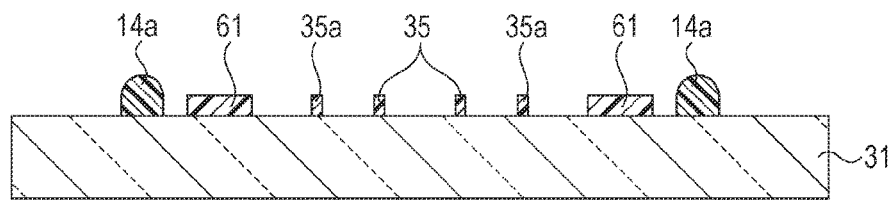
FIG. 12 is a schematic cross-sectional view for explaining a method for producing an electrophoretic display device shown in FIG. 3.

3-1. First, as shown in FIG. 12, a first sealing material 14a is coated on the outer periphery of the frame partition 61 in the atmosphere (step S31).

The material of the first sealing material 14a is for example Kayatoron which is a relatively high viscosity liquid epoxy resin. The viscosity of the first sealing material 14a is for example not less than 300,000 Pa·s and not more than 1 million Pa·s, and is preferably 400,000 Pa·s. The width of the first sealing material 14a when applied is the width enough to withstand a vacuum which is for example 400 μm.

Figure 13:
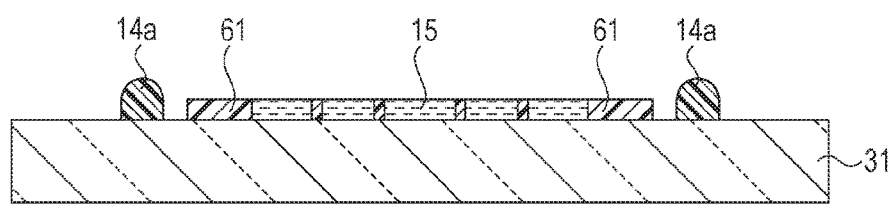
FIG. 13 is a schematic cross-sectional view for explaining a method for producing an electrophoretic display device shown in FIG. 3.

3-2. Then, as shown in FIG. 13, the electrophoretic dispersion liquid containing the electrophoretic particles 34 (white particles, black particles) and a dispersion medium 15 consisting of a silicone oil is applied in the display region E on the element substrate 51 (step S32).

The coating method used for example the dispenser. Further, a die coater and the like can be applied. Also, the viscosity of the silicone oil is for example not more than 10 cP. The amount of the dispersion medium 15 is a liquid volume that satisfies the inside surrounded by the frame partition 61 when the element substrate 51 and the counter substrate 52 are bonded. In the embodiment, the height of the frame partition 61 is for example 33 μm.

Also, the frame partition 61 is formed so that it can be prevented that the first sealing material 14a is entered (spread) into the display region E side. Further, the width of the first sealing material 14a can be regulated so as not to spread than a predetermined width. Thus, the strength of the first seal member 14a can be sufficiently secured.

Figure 14:
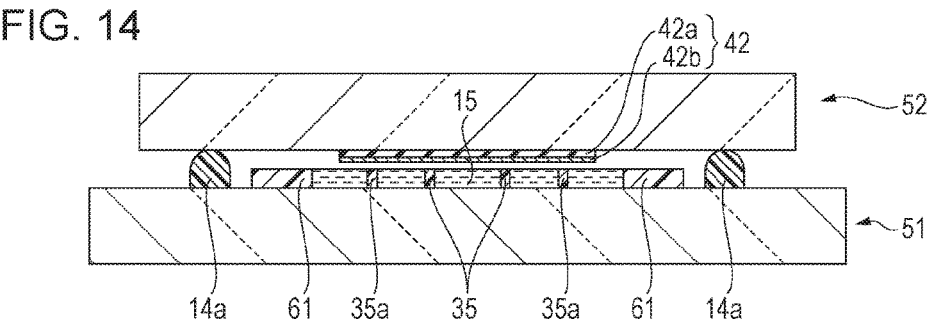
FIG. 14 is a schematic cross-sectional view for explaining a method for producing an electrophoretic display device shown in FIG. 3.

3-3. Then, as shown in FIG. 14, the bonding of the element substrate 51 and the counter substrate 52 is started (step S33).

Also, the bonding presses under vacuum negative pressure environment in order to prevent entering air bubbles into the cell 36. However, silicone oil has a high volatility property, so that the pressure is set to a low vacuum state lower than the atmospheric pressure. Specifically, this pressure is for example 500 Pa.

Figure 15:
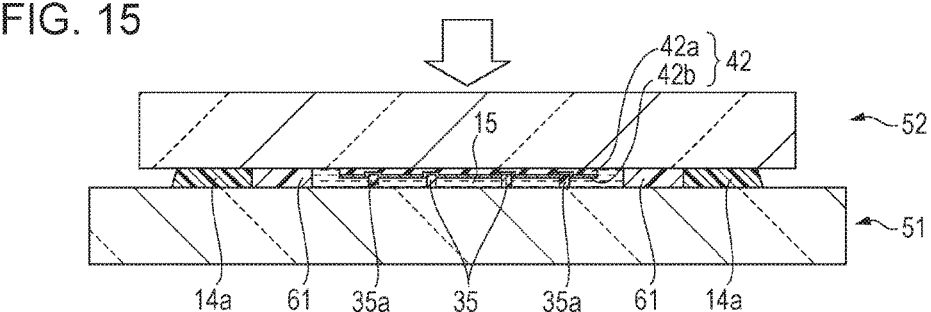
FIG. 15 is a schematic cross-sectional view for explaining a method for producing an electrophoretic display device shown in FIG. 3.

3-4. Then, as shown in FIG. 15, the dispersion medium 15 (the electrophoretic dispersion liquid) between the element substrate 51 and the counter substrate 52 (first seal; step S34) is sealed.

That is, in a low vacuum state, the element substrate 51 and the counter substrate 52 are bonded through the first sealing material 14a.

At this time, until the partition 35' of the apex 35 bites sealing layer 42, that is, when a portion which overlaps with the partition 35 in a plan view and a portion not overlapping with the partition 35 in a plan view, of the contact face between the first sealing layer 42a and the second sealing layer 42b, compared with cross section, the partial overlap in the partition 35 in a plan view is press the substrate 52 to the element substrate 51 until positioned in the second base member 41 side than not the case.

At this time, the frame partition 61 also functions as a spacer defining a cell gap between the element substrate 51 and the counter substrate 52.

As the counter substrate 52 is pressed to the element substrate 51, the first sealing material 14a is crushed, and the dispersion medium 15 is pushed into the frame partition 61 and used to fill the first sealing material 14a side. In this case, the top portion 35' of the partition 35 provided in the display region E, bites into the sealing layer 42 provided on the counter substrate 52 side, and thus the dispersion medium 15 is able to be prevented from moving between adjacent cells 36.

Figure 16:
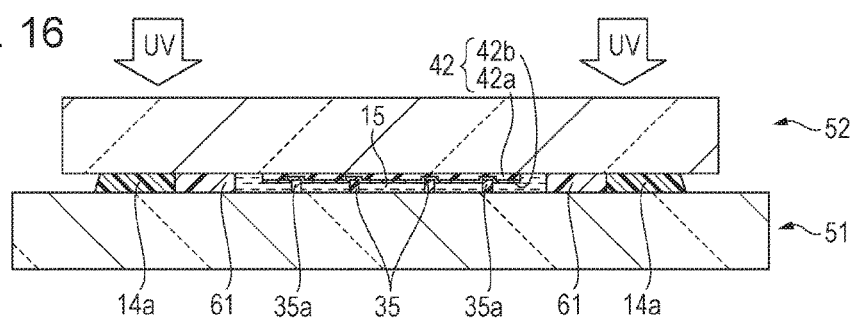
FIG. 16 is a schematic cross-sectional view for explaining a method for producing an electrophoretic display device shown in FIG. 3.

Thereafter, as shown in FIG. 16, the first sealing material 14a is irradiated an ultraviolet ray to be cured when the first sealing material 14a is an ultraviolet curable resin. Also, if the first sealing material 14a is the thermosetting resin, the first sealing material 14a is cured by heating.

A cell gap when the element substrate 51 and the counter substrate 52 are bonded is on the order of not less than 20 μm and not more than 50 μm, which is 33 μm in the embodiment. Further, the width of the first sealing material 14a which is crushed is for example not less than 200 μm and not more than 500 μm, and is 400 μm in the present embodiment.

Figure 17:
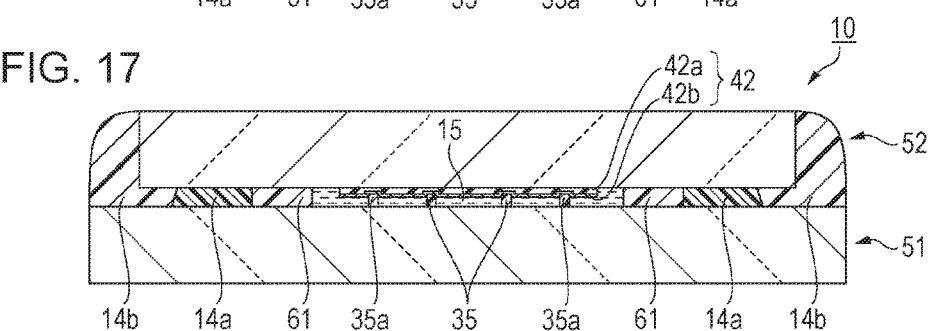
FIG. 17 is a schematic cross-sectional view for explaining a method for producing an electrophoretic display device shown in FIG. 3.

3-5. Then, as shown in FIG. 17, a second sealing material 14b is formed on the outer periphery of the first sealing material 14a to adhere in the air (the second seal; step S35).

Specifically, it is important that the second seal member 14b does not enter a moisture, is relatively low viscosity and enters the gap, and for example an acrylic or epoxy resin. Also, the viscosity of the second sealing member 14b is lower than the viscosity of the first sealing material 14a and for example not less than 100 Pa·s and not more than 500 Pa·s, and is preferably 400 Pa·s. A width of the second sealing member 14b is for example 400 μm.

the method for applying the second sealing member 14b is used for example a dispenser or a die coater and the like. Thus, as shown in FIG. 17, a space sandwiched by the element substrate 51 and the counter substrate 52 are sealed. Thereafter, if necessary, the product is cut to the shape.

The above steps go through, and thus the electrophoretic display device 10 is obtained.

Second Embodiment

Then, a second embodiment of the electrophoretic display device 10 (the electrophoretic display device according to the invention) will be described.

Figure 18:
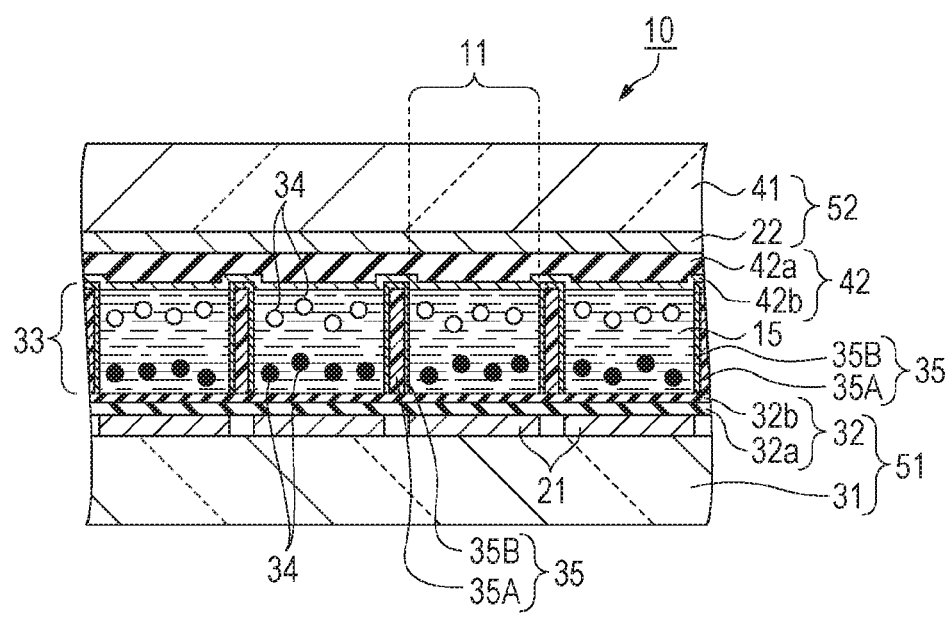
FIG. 18 is a schematic longitudinal cross-sectional view showing a second embodiment of the structure of the electrophoretic display device according to the invention.

FIG. 18 is a schematic longitudinal cross-sectional view showing a second embodiment of the structure of the electrophoretic display device according to the invention.

Hereinafter, an electrophoretic display device 10 of the second embodiment will be mainly described differences from the electrophoretic display device 10 of the first embodiment, and will be omitted the same matters.

The electrophoretic display device 10 of the present embodiment, as shown in FIG. 18, is the same as the electrophoretic display device 10 of the first embodiment shown in FIG. 4 except configuration of the partition 35 for partitioning the electrophoretic layer 33 are different.

That is, in the electrophoretic display device 10 of the second embodiment, the partition 35 has a first partition 35A and a second partition 35B covering the surface of the first partition 35A.

In the partition 35 of the embodiment with such a configuration, the first partition 35A is formed into the same configuration with the partition 35 which an electrophoretic display device 10 of the first embodiment includes.

Further, the second partition 35B is a coating layer of the first partition 35A, which includes a surface in contact with the electrophoretic layer 33, and the contact angle to water of the second partition (covering layer) 35B is not less than 60°. Accordingly, the second partition 35B for covering the first partition 35A also forms a same configuration as the second sealing layer 42b for covering the first sealing layer 42a and the second insulating layer 32b for covering the first insulating layer 32a.

Therefore, in each time of formation of an image by moving of the electrophoretic particles 34, although the electrophoretic particles 34 moves with being in contact with the side surface of the second partition 35B, the contact angle to water of the second partition 35B is not less than 60°, and shows a low polarity, and thus an adsorption of electrophoretic particles 34 to the second partition 35B can be appropriately suppressed or prevented. Accordingly, even by forming the second partition 35B for covering the first partition 35A, the electrophoretic display device 10, becomes to maintain excellent display characteristics for a long time.

The second embodiment of the electrophoretic display device 10 of which has a partition 35 includes a second partition 35B for covering such a first partition 35A, also can be obtained the same effects as the first embodiment.

Above, an electrophoretic display device and an electronic apparatus according to the invention have been described based on the illustrated embodiments, the invention is not limited to the above, each part of the configuration may be replaced with the configuration having similar functions. Any other composition may also be added to the invention. Respective embodiments described above may be appropriately combined.

Further, in the embodiment described above, although the partition 35 was formed a grid pattern, the configuration of the partition 35 (plan view shape) is not particularly limited, and for example, may be configured in a honeycomb shape, a polygonal shape, a round shape, a triangular shape and the like.

The invention is not limited to placing the partition 35 and the frame partition 61 on the element substrate 51 side, the partition 35 and the frame partition 61 may be arranged on the counter substrate 52 side.

Further, the partition 35 is not limited to be formed by a photolithography method, may be formed by for example, a printing process such as a nanoimprint method, a screen printing method, a relief printing method, and a gravure printing method.

Further, the first base member 31 and second base member 41 may be used a light-transmitting material on the display side, may be used beside a glass substrate, and a plastic substrate.

Further, the frame partition 61 is not limited to utilizing as a spacer. For example in the case of providing a separate member as a spacer in order to define the cell gap between the element substrate 51 and the counter substrate 52, the height of the frame partition 61 may be equal to the height of the partition 35.

EXAMPLE

Then, a specific embodiment according to the invention will be described.

1. Production of Samples for Evaluation

Sample No. 1 a. First, a glass substrate having an average thickness of 0.5 mm was prepared as the first base member 31. Then, after the resin layer (31 μm), which was consisted of the urethane resin, was formed on the first base member 31, the resin layer was etching to form a partition 35 having a width of 5 μm, and a height of 31 μm.

b. Then, a glass substrate having an average thickness of 0.5 mm was prepared as the second base member 41. Then, the first sealing layer 42*a* and the second sealing layer 42*b* was formed a film on the second base member 41, and thus a sealing layer 42 was formed.

Also, the first sealing layer 42*a* and the second sealing layer 42*b* were formed by forming a film made of an NBR on the second base member 41 by a spin coating method, then, COP (Nippon Zeon Co., Ltd., "480R") represented by the general formula (I) was performed by depositing by a spin coating method. Also, the thickness of the first sealing layer 42*a* and the second sealing layer 42*b*, obtained at this time, were respectively 1 μm and 0.3 μm. Further, as a result the contact angle to water and methylene iodide of the second sealing layer 42*b* (the coating layer) were measured by using the solid-liquid interface analysis system (manufactured by Kyowa Interface Science Co., Ltd., "DM-700"), respectively, these result was 100° and 47°.

c. Then, Kayatoron which is a liquid epoxy resin was coated as the first sealing material 14*a* on the outer periphery of the partition 35 on the first base member 31. Thereafter, an electrophoretic dispersion containing electrophoretic particles 34 including the black particle and the white particles, and the dispersion medium (silicone oil) 15 was coated in a recess formed by the first base member 31 and the partition 35 to be filled.

d. Then, the second base member 41 where the sealing layer 42 was formed in the step b was bonded to the first base member 31 where the electrophoretic dispersion liquid was filled in the recess in the step c. Also, this bonding is performed by irradiating ultraviolet light to the first sealing material 14*a* to cure after the counter substrate 52 was pressed to the element substrate 51 in a vacuum negative pressure environment of 500 Pa until the top portion 35' of the partition 35 bites in sealing layer 42. Also, the thickness of the electrophoretic layer 33 formed by the top portion 35' of the partition 35 bites into the sealing layer 42 was 30 μm.

By going through the above steps, the evaluation sample of the sample No. 1 was produced.

Sample No. 2

Except the second sealing layer 42*b* was formed by using PVB (manufactured by Sekisui Chemical Co., Ltd., "KS-10") in place of the COP, an evaluation sample of sample No. 2 was produced in the same manner as the above sample No. 1. Also, the contact angle to water and methylene iodide of the second sealing layer 42*b* (the coating layer), in evaluation samples of the sample No. 2, were respectively 60° and 38°.

Sample No. 3

Except the second sealing layer 42*b* was formed by using PVA (Kuraray Co., Ltd., "KURARAY POVAL PVA-217") in place of the COP, the evaluation sample of sample No. 3 was produced in the same manner as the above sample No. 1. Also, the contact angle to water and methylene iodide of the second sealing layer 42*b* (the coating layer), in evaluation samples of the sample No. 3, were respectively 54° and 42°.

2. Evaluation (Change Over Time in Reflectance)

The evaluation samples of each sample No., were respectively measured the reflectivity at the time of the white display (initial reflectivity), then, after the continuous driving for 500 hours, the reflectivity (after driving reflectivity) at the time of the white display was measured again, so that the time change rate of after driving reflectivity was determined when the initial reflectivity is 100%.

The results of these measurements are shown in Table 1.

TABLE 1

|  |  | Sample No. | | |
|---|---|---|---|---|
|  |  | 1 | 2 | 3 |
| Constituent Material of Second Sealing Layer | | COP | PVB | PVA |
| Contact Angle | Water | 100° | 60° | 54° |
|  | Methylene Iodide | 47° | 38° | 42° |
| Evaluation | Change Over Time in Reflectance (after 500 h) | −5% | −20% | −30% |

As evidenced by Table 1, setting the contact angle to water of the second sealing layer 42b (the coating layer) to not less than 60° can be not more than −20% of a temporal change rate (%) of the reflection rate after the drive, so that it is clear that the adsorption of the electrophoretic particles 34 with respect to the second sealing layer 42b can be precisely suppressed.

Also, in the case where the contact angle to water of the second sealing layer 42b is 100°, the temporal change rate (%) of the reflection rate was −5%. Although the adsorption of the electrophoretic particles 34 with respect to the second sealing layer 42b can be more accurately suppressed, the repulsive force of the electrophoretic particles 34 against the second sealing layer 42b is too large, so that the retention rate of the image after the application of voltage has the potential to be lowered according to the particle diameter of the electrophoretic particles 34. Therefore, the contact angle to water of the second sealing layer 42b is inferred preferably not less than 70° and not more than 95°, more preferably not less than 80° and not more than 90°.

The entire disclosure of Japanese Patent Application No. 2015-174999, filed Sep. 4, 2015 is expressly incorporated by reference herein.

What is claimed is:

1. An electrophoretic display device comprising:
a first substrate;
a second substrate disposed opposite to the first substrate;
a partition disposed between the first substrate and the second substrate; and
a dispersion liquid containing electrophoretic particles and a dispersion medium and disposed in a space defined by the partition,
wherein
a first electrode is disposed on the first substrate and a second electrode is disposed on the second substrate,
at least one of the first electrode and the second electrode includes a coating layer on a surface thereof which is in contact with the dispersion liquid,
a contact angle to water of the coating layer is not less than 60°,
the second substrate includes a sealing layer, and
the sealing layer has the coating layer on a surface thereof which is in contact with the dispersion liquid.

2. The electrophoretic display device according to claim 1, wherein the first substrate includes an insulating layer, and
the insulating layer has the coating layer on a surface thereof which is in contact with the dispersion liquid.

3. An electronic apparatus comprising the electrophoretic display device according to claim 2.

4. The electrophoretic display device according to claim 1, wherein the partition further includes the coating layer on a surface thereof which is in contact with the dispersion liquid.

5. An electronic apparatus comprising the electrophoretic display device according to claim 4.

6. The electrophoretic display device according to claim 1, wherein a contact angle to methylene iodide of the coating layer is not more than 50°.

7. An electronic apparatus comprising the electrophoretic display device according to claim 6.

8. The electrophoretic display device according to claim 1, wherein the coating layer mainly contains at least one of cycloolefin polymer, ethylene-vinyl alcohol copolymer and a methyl terpene copolymers.

9. An electronic apparatus comprising the electrophoretic display device according to claim 8.

10. The electrophoretic display device according to claim 1, wherein the coating layer has an average thickness of not less than 0.05 μm and not more than 0.5 μm.

11. An electronic apparatus comprising the electrophoretic display device according to claim 10.

12. An electronic apparatus comprising the electrophoretic display device according to claim 1.

13. An electrophoretic display device comprising:
a first substrate;
a second substrate disposed opposite to the first substrate;
a partition disposed between the first substrate and the second substrate; and
a dispersion liquid containing electrophoretic particles and a dispersion medium and disposed in a space defined by the partition,
wherein
a first electrode is disposed on the first substrate and a second electrode is disposed on the second substrate,
at least one of the first electrode and the second electrode includes a coating layer on a surface thereof which is in contact with the dispersion liquid,
a contact angle to water of the coating layer is not less than 60°,
the first substrate includes an insulating layer, and
the insulating layer has the coating layer on a surface thereof which is in contact with the dispersion liquid.

14. An electrophoretic display device comprising:
a first substrate;
a second substrate disposed opposite to the first substrate;
a partition disposed between the first substrate and the second substrate; and
a dispersion liquid containing electrophoretic particles and a dispersion medium and disposed in a space defined by the partition,
wherein
a first electrode is disposed on the first substrate and a second electrode is disposed on the second substrate,
at least one of the first electrode and the second electrode includes a coating layer on a surface thereof which is in contact with the dispersion liquid,
a contact angle to water of the coating layer is not less than 60°, and
the partition further includes the coating layer on a surface thereof which is in contact with the dispersion liquid.

15. An electrophoretic display device comprising:
a first substrate;
a second substrate disposed opposite to the first substrate;
a partition disposed between the first substrate and the second substrate; and
a dispersion liquid containing electrophoretic particles and a dispersion medium and disposed in a space defined by the partition, wherein
- a first electrode is disposed on the first substrate and a second electrode is disposed on the second substrate,
- at least one of the first electrode and the second electrode includes a coating layer on a surface thereof which is in contact with the dispersion liquid,
- a contact angle to water of the coating layer is not less than 60°, and
- a contact angle to methylene iodide of the coating layer is not more than 50°.

16. An electrophoretic display device comprising:
a first substrate;
a second substrate disposed opposite to the first substrate;
a partition disposed between the first substrate and the second substrate; and
a dispersion liquid containing electrophoretic particles and a dispersion medium and disposed in a space defined by the partition,
wherein
- a first electrode is disposed on the first substrate and a second electrode is disposed on the second substrate,
- at least one of the first electrode and the second electrode includes a coating layer on a surface thereof which is in contact with the dispersion liquid,
- a contact angle to water of the coating layer is not less than 60°, and
- the coating layer mainly contains at least one of cycloolefin polymer, ethylene-vinyl alcohol copolymer and a methyl terpene copolymers.

17. An electrophoretic display device comprising:
a first substrate;
a second substrate disposed opposite to the first substrate;
a partition disposed between the first substrate and the second substrate; and
a dispersion liquid containing electrophoretic particles and a dispersion medium and disposed in a space defined by the partition,
wherein
- a first electrode is disposed on the first substrate and a second electrode is disposed on the second substrate,
- at least one of the first electrode and the second electrode includes a coating layer on a surface thereof which is in contact with the dispersion liquid,
- a contact angle to water of the coating layer is not less than 60°, and
- the coating layer has an average thickness of not less than 0.05 µm and not more than 0.5 µm.

* * * * *